United States Patent
Tsuda et al.

(10) Patent No.: US 7,259,882 B2
(45) Date of Patent: Aug. 21, 2007

(54) PRINTING SYSTEM, PRINTING METHOD, DATA SERVER, RECORDING MEDIUM, AND PROGRAM FOR PERFORMING PRINTING VIA A COMMUNICATIONS NETWORK

(75) Inventors: Kunikazu Tsuda, Kanagawa (JP); Toshiharu Shibata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 794 days.

(21) Appl. No.: 10/189,411

(22) Filed: Jul. 8, 2002

(65) Prior Publication Data

US 2003/0007175 A1 Jan. 9, 2003

(30) Foreign Application Priority Data

Jul. 9, 2001 (JP) .............................. 2001-207803

(51) Int. Cl.
*G06F 3/12* (2006.01)
*G06K 15/00* (2006.01)
(52) U.S. Cl. ..................................... 358/1.15; 358/1.14
(58) Field of Classification Search ........ 358/1.1–1.18; 709/102, 103, 228, 229, 231, 232; 710/7, 710/8
See application file for complete search history.

(56) References Cited

U.S. PATENT DOCUMENTS 7,075,670 B1 *   7/2006   Koga .......................... 358/1.15

FOREIGN PATENT DOCUMENTS

| EP | 0 860 986 | 8/1998 |
|----|-----------|--------|
| EP | 1 096 363 | 5/2001 |
| JP | 4-317118  | 11/1992 |

* cited by examiner

*Primary Examiner*—Douglas Q. Tran
(74) *Attorney, Agent, or Firm*—Oblon, Spivak, McClelland, Maier & Neustadt, P.C.

(57) ABSTRACT

An application server, a data server, and a printer are connected to one another via a communication network. The application server executes application software. Then, the application server generates print data for printing an interim result or final result of processing performed by the application software, and sends the print data to the data server. The data server provides the supplied print data to the printer. The printer performs printing in accordance with the provided print data.

10 Claims, 8 Drawing Sheets

PRINTING SYSTEM, PRINTING METHOD, DATA SERVER, RECORDING MEDIUM, AND PROGRAM FOR PERFORMING PRINTING VIA A COMMUNICATIONS NETWORK

BACKGROUND OF THE INVENTION

1. Field of the Invention

The present invention relates to a system, a method, a data server, a recording medium and a program for performing printing via a communications network.

2. Description of the Related Art

Conventionally, printing through a closed network, such as a network built in a company, has been performed with the use of a technique such as disclosed in Unexamined Japanese Patent Application KOKAI Publication No. H4-317118, for example. Specifically, using a control device for controlling a plurality of printers, print data supplied from a plurality of host devices are distributed efficiently to the plurality of printers.

The content of Unexamined Japanese Patent Application KOKAI Publication No. H4-317118 is incorporated herein by reference.

There have been known application service providers (ASP) that offer services for providing application software such as business software through the Internet.

Some ASPs offer their services using a so-called SBC (Server Based Computing) method.

According to the SBC method, client software designed exclusively for utilizing application software provided by the ASP server is preinstalled in a terminal of the user of this service. The user utilizes the application software provided by the ASP, by using the client software installed in his/her terminal.

In this SBC method, if the user wants to print out the interim result or final result of processing performed by the application software, the user once transfers the print data from the ASP server to his/her terminal. Then, the user outputs the transferred print data to a printer which is to print the print data.

However, such a printing method in this SBC system may give a heavy load on the communication between the ASP server and the user's terminal, if the print data includes a large amount. As a result, not only this user's terminal which instructs printing, but also other terminals may not obtain a quick response.

SUMMARY OF THE INVENTION

Accordingly, an object of the present invention is to provide a printing system, a printing method, a data server, a recording medium, and a program for reducing the load to be imposed on communication between a server executing application software and a user terminal.

To accomplish the above object, a printing system according to a first aspect of the present invention comprises:

an application server which executes application software;

a data server which provides print data for printing an interim result or final result of processing performed by the application software; and a printer which performs printing in accordance with the print data provided by the data server, wherein:

the application server, the data server, and the printer are connected to one another via a communication network;

the application server includes a data generator which generates the print data, and a first data sender which sends the generated print data to the data server; and the data server provides the print data supplied from the first data sender to the printer.

According to this invention, the print data is provided to the printer from the data server which is prepared independently from the application server. Therefore, even if a user terminal is connected to the application server, load to be imposed on the communication between the application server and the user terminal due to a printing operation, can be reduced.

The printing system may further comprise a user terminal which supplies a URL (Uniform Resource Locator) for specifying the printer to which the print data is to be provided, to the data server in accordance with an operation of a user.

In this case, the data server may send the print data to the printer which is specified by the URL.

The data server may include:

a determiner which determines whether or not printing can be performed by the printer; and a second data sender which sends the print data to the printer, in a case where the determiner determines that printing can be performed by the printer.

The data server may store the print data supplied from the application server, and may supply a URL (Uniform Resource Locator) for specifying a storage location of the print data to the printer.

In this case, the printer may include a downloader which downloads the print data from the storage location specified by the URL.

The printer may notify the data server of completion of printing, and the data server may erase the stored print data in response to a notification from the printer.

A printing system according to a second aspect of the present invention comprises:

an application server which executes application software;

a data server which provides print data for printing an interim result or final result of processing performed by the application software; and a plurality of printers which perform printing in accordance with the print data provided by the data server, wherein:

the application server, the data server, and the plurality of printers are connected to one another via a communication network;

the data server includes a data generator which generates the print data, and a sender which sends the generated print data to a predetermined printer.

Types of the plurality of printers may be different from each other.

In this case, the data server may include a plurality of printer drivers corresponding to the plurality of printers respectively, and a specifier which specifies a printer driver which corresponds to the predetermined printer, and the data generator may generate the print data by executing the printer driver specified by the specifier.

The specifier may obtain information regarding the predetermined printer from the predetermined printer, and may specify the printer driver which corresponds to the predetermined printer using the obtained information.

A printing method according to a third aspect of the present invention comprises:

an executing step of executing application software in an application server;

a data generating step of generating in the application server, print data for printing an interim result or final result of processing performed by the application software;

a first data sending step of sending the print data from the application server to a data server connected thereto via a communication network;

a data providing step of providing from the data server, the print data supplied from the application server, to a printer connected to the data server via the communication network; and a printing step of performing printing in the printer in accordance with the print data provided from the data server.

The printing method may further comprise a first URL supplying step of supplying from a user terminal connected to the communication network, a URL (Uniform Resource Locator) for specifying the printer to which the print data is to be provided, to the data server in accordance with an operation of a user.

In this case, the data providing step may include a second data sending step of sending the print data from the data server to the printer which is specified by the URL.

The printing method may further comprise a determining step of determining in the data server whether or not printing can be performed by the printer.

In this case, the second data sending step may include a step of sending the print data from the data server in a case where it is determined in the determining step that printing can be performed.

The printing method may further comprise:

a storing step of storing the print data supplied from the application server in the data server;

a second URL supplying step of supplying from the data server, a URL (Uniform Resource Locator) for specifying a storage location of the print data to the printer; and a downloading step of downloading the print data to the printer from the storage location specified by the URL.

In this case, the printing step may include a step of performing printing in accordance with the print data downloaded to the printer.

The printing method may further comprise:

a notifying step of notifying from the printer that printing is completed, to the data server; and an erasing step of erasing the print data stored in the data server, in response to a notification from the printer.

A printing method according to a fourth aspect of the present invention comprises:

an executing step of executing application software in an application server;

a data generating step of generating in a data server connected to the application server via a communication network, print data for printing an interim result or final result of processing performed by the application software;

a data sending step of sending the print data from the data server to a predetermined printer among a plurality of printers connected to the data server via the communication network; and a printing step of performing printing in the predetermined printer in accordance with the print data supplied from the data server.

Types of the plurality of printers may be different from each other, the data server may include a plurality of printer drivers corresponding to the plurality of printers respectively, the printing method may further comprise a specifying step of specifying by the data server, a printer driver which corresponds to the predetermined printer, and the data generating step may include a step of generating in the data server, the print data by executing the printer driver specified in the specifying step.

The specifying step may include:

a step of obtaining by the data server, information regarding the predetermined printer from the predetermined printer; and a step of specifying by the data server, the printer driver which corresponds to the predetermined printer, using the obtained information.

A data server according to a fifth aspect of the present invention generates print data for printing an interim result or final result of processing performed by application software executed by an application server which is connected to the data server via a communication network, the data server comprising:

a plurality of printer drivers which correspond respectively to a plurality of different types of printers which are connected to one another via the communication network;

a specifier which specifies a printer driver which corresponds to a printer among the plurality of printers that is the target of outputting the print data:

a data generator which generates the print data by executing the printer driver specified by the specifier; and a sender which sends the generated print data to the target printer.

The specifier may obtain information regarding the target printer from the target printer, and may specify the printer driver which corresponds to the target printer using the obtained information.

A computer-readable recording medium according to a sixth aspect of the present invention stores a program for controlling a computer to function as a data server which generates print data for printing an interim result or final result of processing performed by application software executed by an application server which is connected to the data server via a communication network, the data server comprising:

a plurality of printer drivers which correspond respectively to a plurality of different types of printers which are connected to one another via the communication network;

a specifier which specifies a printer driver which corresponds to a printer among the plurality of printers that is the target of outputting the print data:

a data generator which generates the print data by executing the printer driver specified by the specifier; and a sender which sends the generated print data to the target printer.

A program according to a seventh aspect of the present invention controls a computer to function as a data server which generates print data for printing an interim result or final result of processing performed by application software executed by an application server which is connected to the data server via a communication network, the data server comprising:

a plurality of printer drivers which correspond respectively to a plurality of different types of printers which are connected to one another via the communication network;

a specifier which specifies a printer driver which corresponds to a printer among the plurality of printers that is the target of outputting the print data:

a data generator which generates the print data by executing the printer driver specified by the specifier; and a sender which sends the generated print data to the target printer.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

A printing system according to a first embodiment of the present invention will be explained with reference to the drawings.

Figure 1:
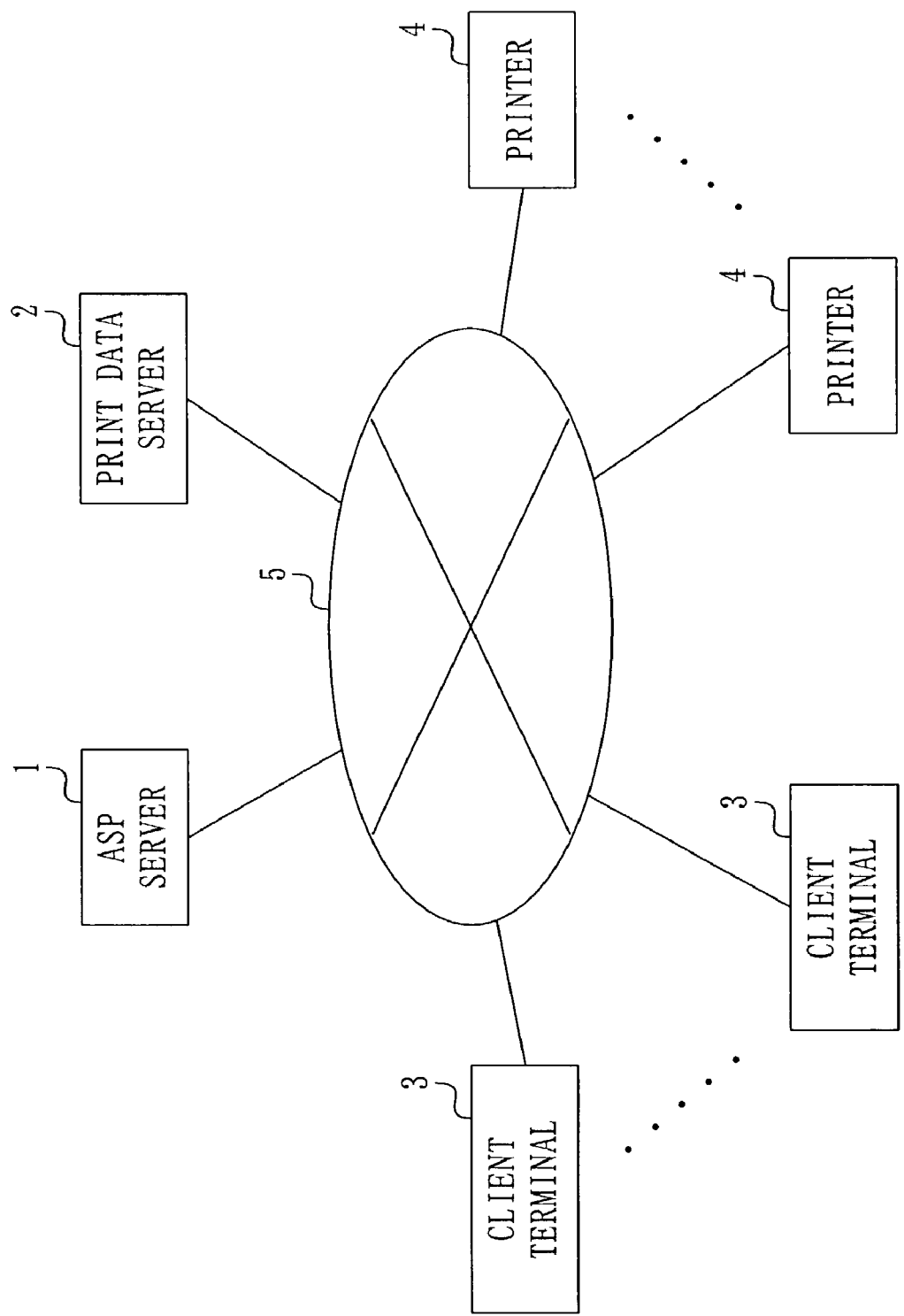
FIG. 1 is a diagram showing a structure of a printing system according to a first embodiment.

A printing system according to a first embodiment comprises an ASP (Application Service Provider) server 1, a print data server 2, a plurality of client terminals 3, a plurality of printers 4, and a network 5, as shown in FIG. 1.

As shown in FIG. 1, the ASP server 1, the print data server 2, the plurality of client terminals 3, and the plurality of printers 4 are connected to one another via the network 5. The network 5 may be the Internet, a WAN (Wide Area Network), an intranet, a LAN (Local Area Network), or the like.

The ASP server 1 is a server device comprising a communication unit, a storage unit, and a control unit, and stores various application software to be used on the printing system. Such application software include accounting software, salary management software, electronic clinical chart creation software, text editing software, and the like. At the request of a client terminal 3, the ASP server 1 executes application software specified by this client terminal 3. Any application software will be provided by the ASP server 1 through SBC (Server Based Computing).

The communication unit includes a modem and the like, to connect the ASP server 1 to the network 5.

The storage unit comprises a hard disk, a RAM (Random Access Memory), and a ROM (Read Only Memory), and stores programs and data for activating the ASP server 1.

The control unit comprises a CPU (Central Processing Unit) and controls the operation of the ASP server 1 in accordance with the programs stored in the storage unit.

While the control unit acts in accordance with the programs stored in the storage unit, the ASP server 1 causes a print data generation function and a print data output function. In other words, the ASP server 1 functionally comprises a print data generation unit 11 and a print data output unit 12, as shown in FIG. 2.

Figure 2:
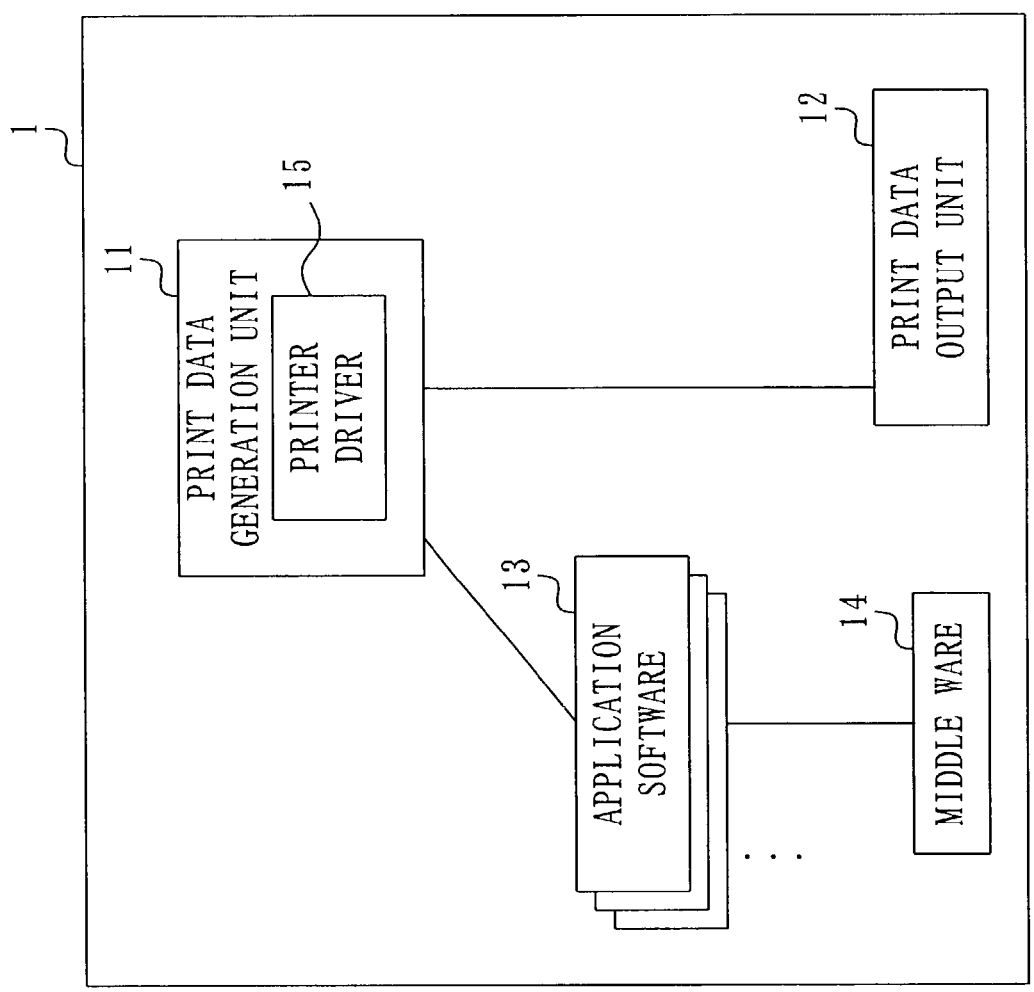
FIG. 2 is a diagram showing a structure of an ASP server included in the printing system shown in FIG. 1.

Further, the ASP server 1 comprises various application software 13, middleware 14, and a printer driver 15, as shown in FIG. 2.

The middleware 14 intervenes between the ASP server 1 and the client terminals 3. Specifically, the middleware 14 hands over a signal supplied from a client terminal 3 to the application software 13, and sends an interim result or final result of processing performed by the application software 13 to the client terminal 3.

The printer driver 15 generates print data to be printing-processed by the printers 4.

The print data generation unit 11 executes the printer driver 15 in response to a print request supplied from a client terminal 3, so as to generate print data for printing out the interim result or final result of processing performed by the application software 13.

The print data output unit 12 outputs to the print data server 2, the print data generated by the print data generation unit 11, together with a URL (Uniform Resource Locator) supplied from the client terminal 3 for specifying a printer 4 for outputting this print data.

The print data server 2 is a Web server comprising a communication unit, a storage unit, and a control unit, and supplies the print data sent from the ASP server 1 to the specified printer 4.

The communication unit comprises a modem, etc., and connects the print data server 2 to the network 5.

The storage unit comprises a hard disk, a RAM, and a ROM, and stores programs and data for activating the print data server 2.

The control unit comprises a CPU, and controls the operation of the print data server 2 in accordance with the programs stored in the storage unit.

The print data server 2 receives print data supplied from the print data output unit 12 of the ASP server 1, and temporarily stores it. The print data server 2 sends the supplied print data to the printer 4 specified by the URL supplied together with print data.

Each client terminal 3 is a personal computer comprising a communication unit, an input unit, a display unit, a storage unit, and a control unit, for example.

The communication unit comprises a modem, etc., and connects the client terminal 3 to the network 5.

The input unit comprises at least one input means, such as a keyboard, a mouse, an input key, a touch panel, and the like, and is operated by a user.

The display unit comprises a CRT (Cathode Ray Tube) or a liquid crystal panel, and displays an interim result or final result of processing performed by the application software 13.

The storage unit comprises at least one storage means such as a hard disk, a RAM, a ROM, and the like, and stores programs and data for activating the client terminal 3.

The control unit comprises a CPU, and controls the operation of the client terminal 3 in accordance with the programs stored in the storage unit.

Each client terminal 3 may be a Thin Client terminal that is cheap and has no environment for executing application software.

Each client terminal 3 requests the ASP server 1 to execute the application software 13 designated by a user, in accordance with the operation of the user. Further, each client terminal 3 requests the ASP server 1 to output an interim result or final result of processing performed by the application software 13 to a printer 4 specified by the user.

Each printer 4 is identified by a URL. Each printer 4 prints an interim result or final result of processing performed by the application software 13, in accordance with print data supplied from the print data server 2.

Next, the operation of the printing system according to the first embodiment will be explained.

Figure 3:
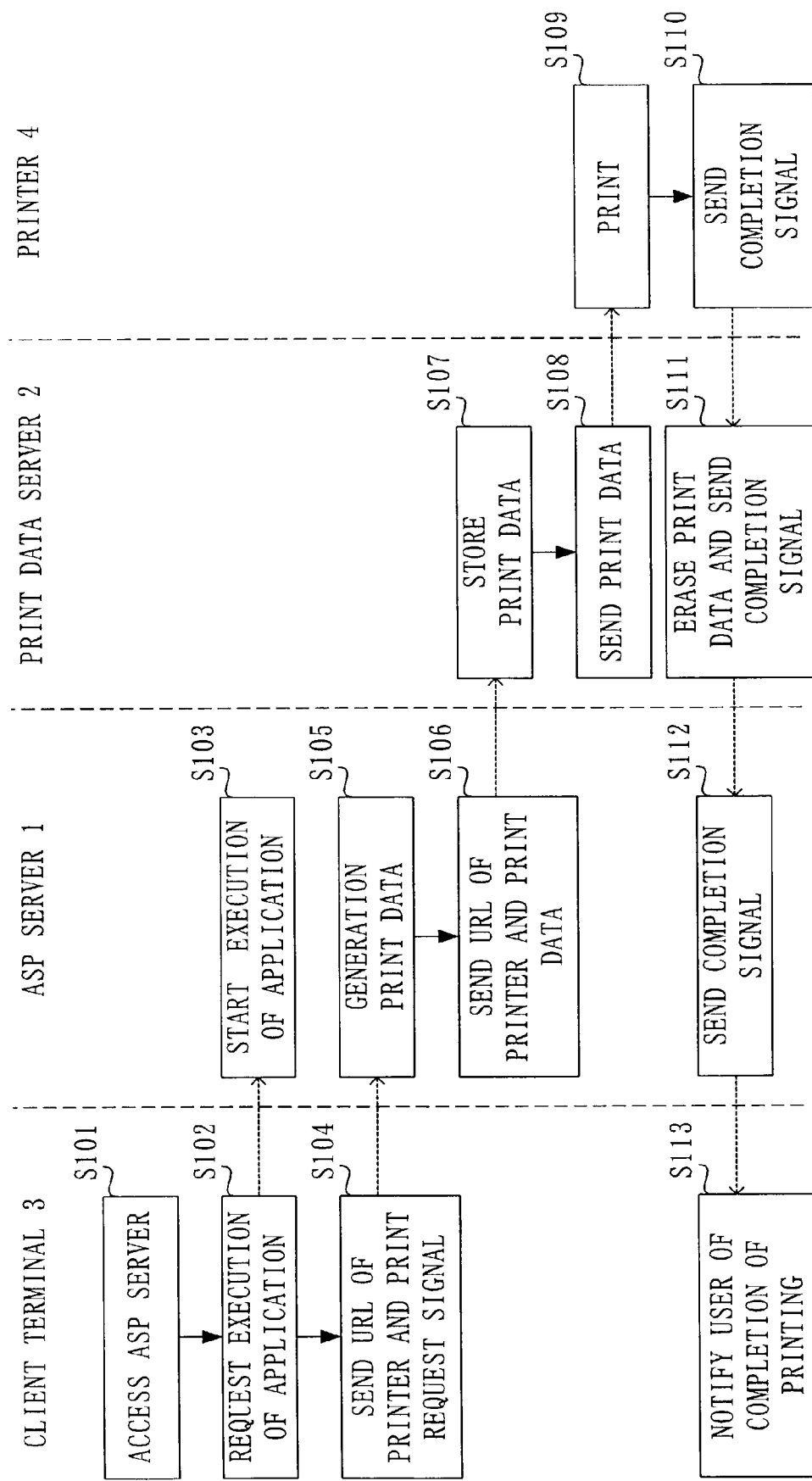
FIG. 3 is a flowchart showing an operation of the printing system according to the first embodiment.

FIG. 3 is a flowchart showing the operation of the printing system.

The user of a client terminal 3 accesses the ASP server 1 by operating the client terminal 3, and performs his/her processes on the application software 13 provided by the ASP server 1.

First, the client terminal 3 accesses the ASP server 1 through the network 5, in accordance with the operation of the user (step S101).

Then, the client terminal 3 designates application software 13 that is designated by the user, and requests the ASP server 1 to execute the designated application software 13, in accordance with the operation of the user (step S102).

In response to the request from the client terminal 3, the ASP server 1 starts executing the application software 13 designated by the client terminal 3 (step S103).

The interim result of processing performed by the application software 13 is transmitted to the client terminal 3 through the middleware 14 at any time. The client terminal 3 displays the interim result of the application software 13 supplied from the ASP server 1 for showing the result to the user.

If the user intends to print the interim result or final result of processing performed by the application software 13, the user operates the client terminal 3 and specifies a printer 4 for outputting the interim result or final result. Then, the user operates the client terminal 3 to request the ASP server 1 to print the interim result or final result.

The client terminal 3 sends a URL for specifying the printer 4 for outputting the result, and a print request signal for requesting printing of the interim result or final result to the ASP server 1 via the network 5 in accordance with the operation of the user (step S104).

In response to the print request signal from the client terminal 3, the print data generation unit 11 of the ASP server 1 generates print data for printing the interim result or final result obtained by the application software 13 by executing the printer driver 15 (step S105).

Then, the print data generation unit 11 of the ASP server 1 outputs the generated print data to the print data output unit 12. In response to the print data supplied from the print data generation unit 11, the print data output unit 12 sends the supplied print data and the URL supplied from the client terminal 3 to the print data server 2 (step S106).

In response to the URL and print data sent from the ASP server 1, the print data server 2 acquires the supplied print data and stores it (step S107).

Then, the print data server 2 sends the supplied print data to the printer 4 specified by the supplied URL using a push technique, for example (step S108).

The printer 4, which is supplied with the print data from the print data server 2, prints the interim result or final result of the application software 13, in accordance with this supplied print data (step S109).

When printing is completed, the printer 4 sends a completion signal representing the completion of printing to the print data server 2 (step S110).

In response to the completion signal supplied from the printer 4, the print data server 2 erases the print data which is stored in step S107. Then, the print data server 2 sends the completion signal supplied from the printer 4 to the ASP server 1 (step S111).

The ASP server 1 sends the completion signal supplied from the print data server 2 to the client terminal 3 via the middleware 14 (step S112).

In response to the completion signal supplied from the ASP server 1, the client terminal 3 notifies the user of the completion of printing (step S113). For example, the client terminal 3 displays a message representing the completion of printing. Thus, the user can know the completion of printing.

As described above, the print data is supplied to the printer 4 from the print data server 2, which is prepared independently from the ASP server 1. Therefore, the communication line between the ASP server 1 and the client terminal 3 will not be occupied by print data. Further, the ASP server 1 can concentrate upon execution of the application software 13. This prevents the processing speed of the application software 13 from being lowered by the printing operation.

Next, a printing system according to a second embodiment of the present invention will be explained with reference to the drawings.

The printing system according to the second embodiment comprises an ASP server 1, a print data server 2, a plurality of client terminals 3, a plurality of printers 4, and a network 5, likewise the first embodiment.

According to the second embodiment, the print data server 2 will not send print data to the printers 4, but the printers 4 themselves get print data stored in the print data server 2.

Print data stored in the print data server 2 is identified by a URL.

Figure 4:
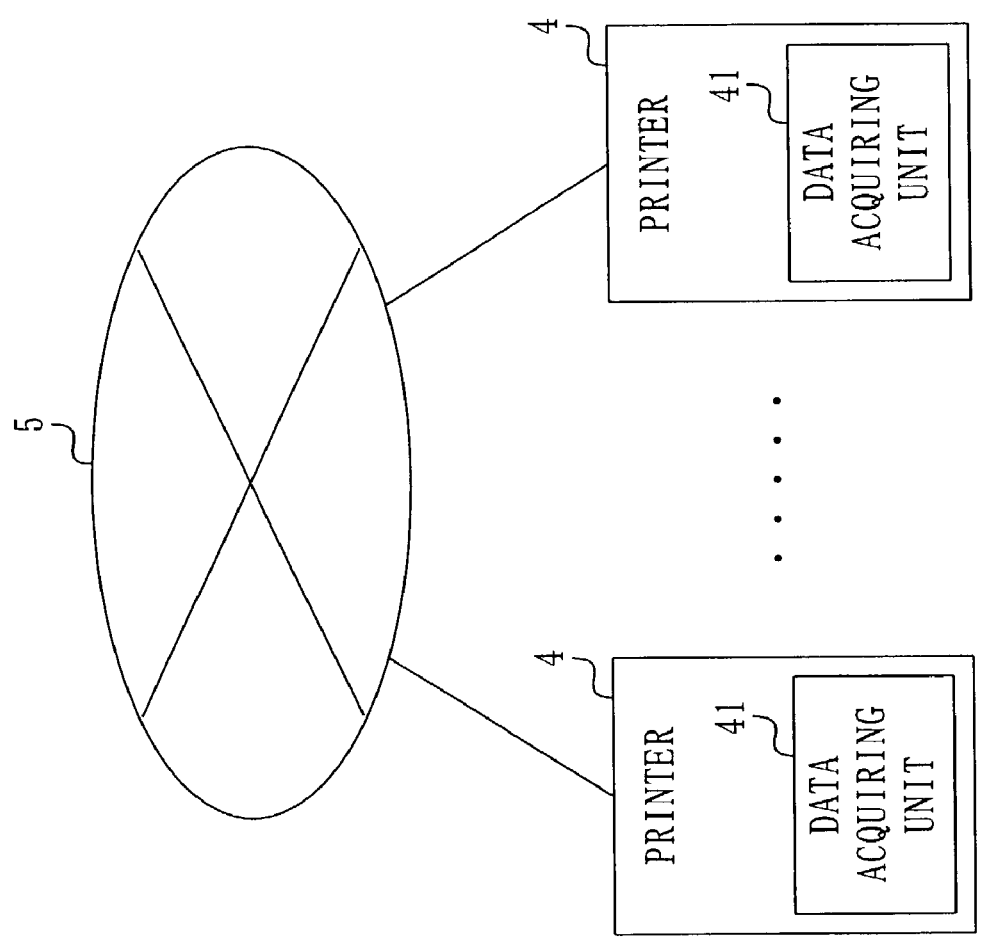
FIG. 4 is a diagram showing a structure of a printer included in a printing system according to a second embodiment.

Each printer 4 comprises an ordinary printing function, and also a downloading function for downloading print data specified by a URL from the print data server 2. Specifically, each printer 4 comprises a data acquiring unit 41 for downloading print data from the print data server 2, as shown in FIG. 4. Each printer 4 performs printing in accordance with the print data acquired by the data acquiring unit 41.

The structure of the printing system according to the second embodiment is substantially the same as that of the printing system according to the first embodiment, except the above described point.

The operation of the printing system according to the second embodiment will now be explained.

Figure 5A:
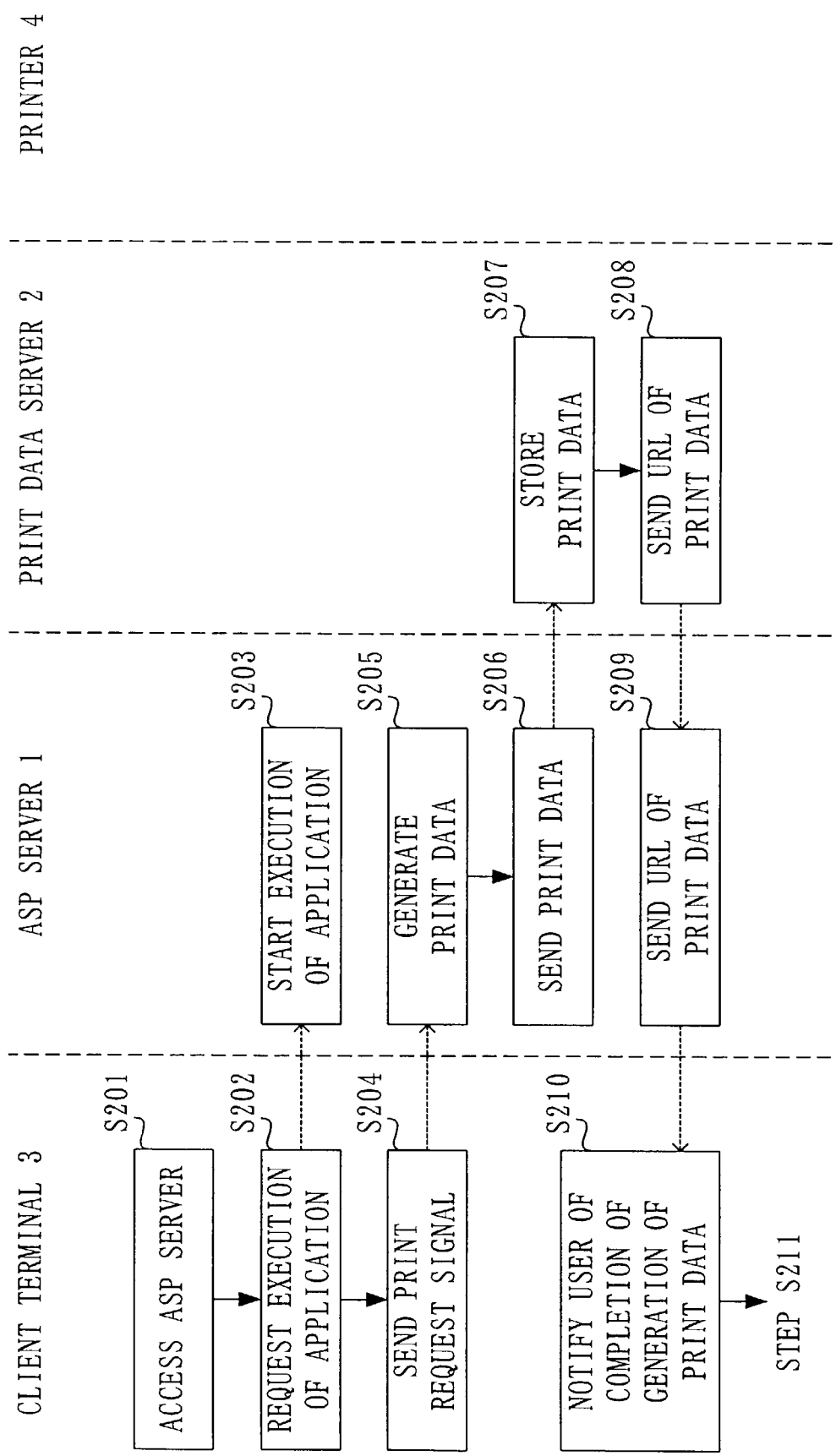
FIGS. 5A and 5B are flowcharts showing an operation of the printing system according to the second embodiment.
Figure 5B:
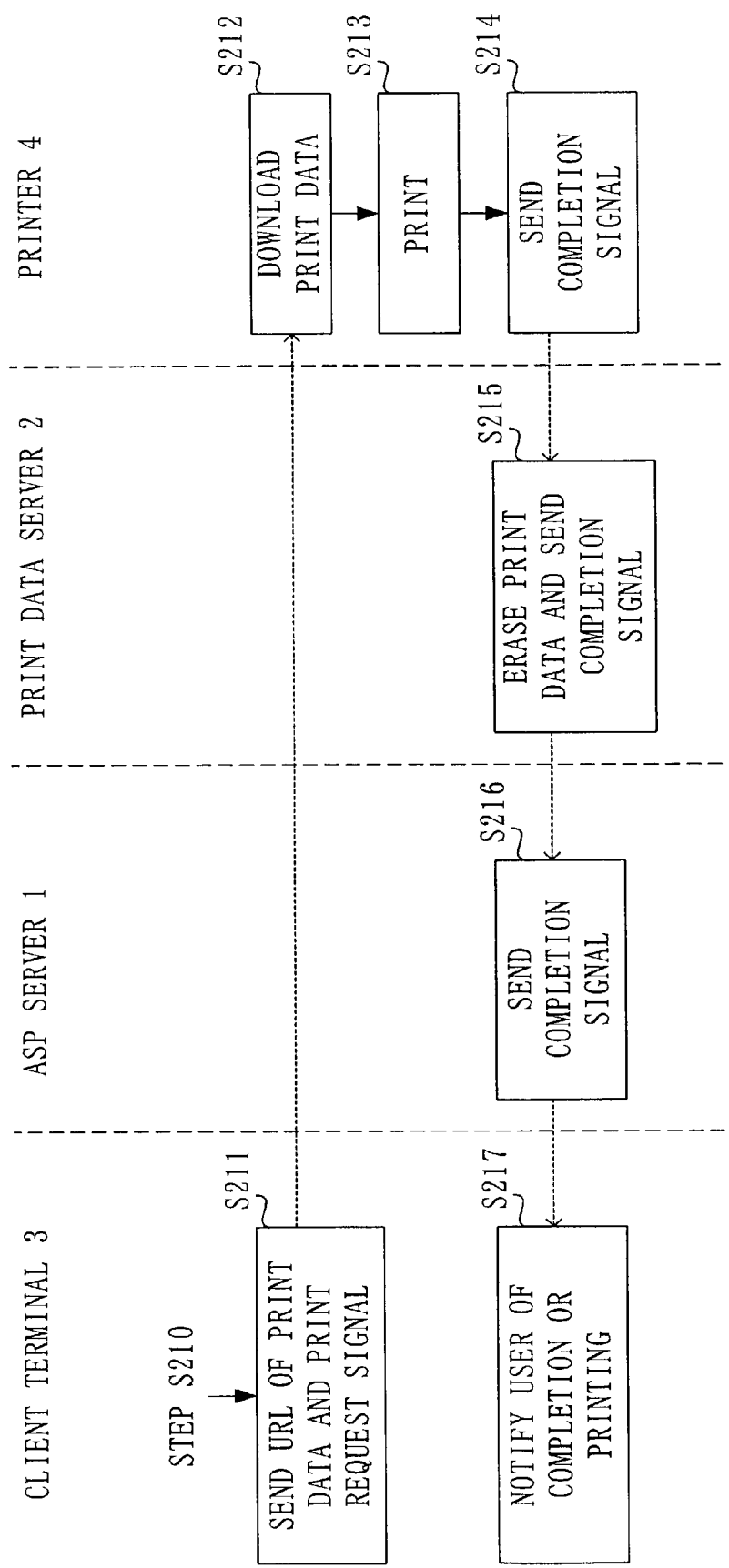

FIGS. 5A and 5B are flowcharts showing the operation of the printing system according to the second embodiment.

Processes from user's access to the ASP server 1 using a client terminal 3, to execution of the application software 13 by the ASP server 1 in response to the request from the client terminal 3 (steps S201 to S203) are substantially the same as steps S101 to S103 explained in the first embodiment.

In a case where a user wants to print an interim result or final result of processing performed by the application software 13, the user operates his/her client terminal 3 to request the ASP server 1 to print the interim result or final result. At this time, the user needs not to specify a printer 4 for outputting the result.

The client terminal 3 sends a print request signal for requesting printing of the interim result or final result to the ASP server 1 via the network 5, in accordance with the operation of the user (step S204).

In response to the print request signal from the client terminal 3, the print data generation unit 11 of the ASP server 1 generates print data for printing the interim result or final result of processing performed by the application software 13 by executing the printer driver 15 (step S205).

Then, the print data generation unit 11 of the ASP server 1 outputs the generated print data to the print data output unit 12. In response to the print data supplied from the print data generation unit 11, the print data output unit 12 sends the supplied print data to the print data server 2 (step S206).

In response to the print data sent from the ASP server 1, the print data server 2 acquires the supplied print data and stores it (step S207).

Then, the print data server 2 sends a URL for specifying the storage location of the print data now stored, to the ASP server 1 (step S208).

In response to the URL supplied from the print data server 2, the ASP server 1 sends the supplied URL to the client terminal 3 via the middleware 14 (step S209).

The client terminal 3 notifies the user that generation of the print data is completed, in response to the URL supplied from the ASP server 1 (step S210). For example, the client terminal 3 displays a message representing that generation of the print data is completed.

The user, by operating the client terminal 3, specifies a printer 4 for outputting the interim result or final result of processing performed by the application software 13. Then, the user requests the specified printer 4 to print the interim result or final result by operating the client terminal 3.

In accordance with the operation of the user, the client terminal 3 sends the supplied URL of the print data, and a print request signal for requesting printing of the interim result or final result, to the specified printer 4 via the network 5 (step S211).

The data acquiring unit 41 of the printer 4 accesses the print data server 2 via the network 5, in response to the print request signal supplied from the client terminal 3. Then, the data acquiring unit 41 downloads the print data specified by the URL supplied together with the print request signal, from the print data server 2 (step S212).

Then, the printer 4 prints the interim result or final result of processing performed by the application software 13, in accordance with the downloaded print data (step S213).

Processes after completion of printing (processes from step S214 and thereafter) are substantially the same as processes from step S110 and thereafter shown in the first embodiment.

As described above, the print data is supplied to the printer 4 from the print data server 2 prepared independently from the ASP server 1. On account of this, the communication line between the ASP server 1 and the client terminal 3 will not be occupied by the print data. Further, since the ASP server 1 can concentrate upon execution of the application software 13, the processing speed of the application software 13 will not be lowered by the printing operation.

Furthermore, since the printer 4 accesses the print data server 2 and downloads the print data, the printer 4 can perform printing, even if a firewall is set between the print data server 2 and the printer 4.

Figure 6:
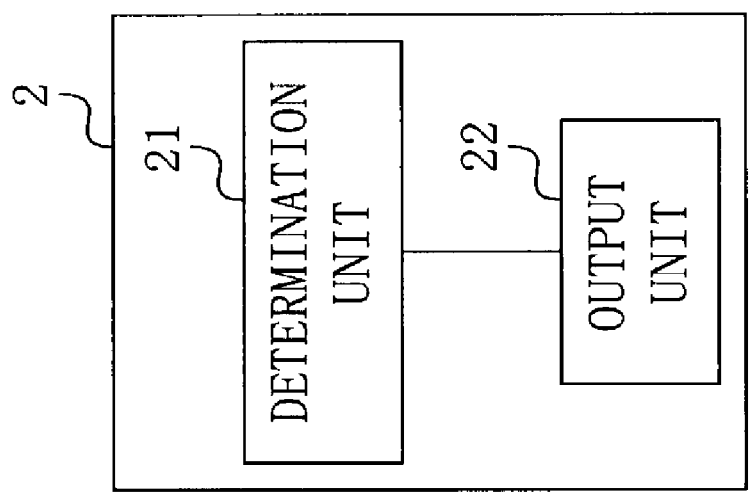
FIG. 6 is a diagram showing another structure of a print data server according to the first embodiment.

The print data server 2 shown in the first embodiment may have a determination function for determining whether or not printing can be performed by the printer 4 specified by the client terminal 3. In other words, the print data server 2 may comprise a determination unit 21 for determining whether or not printing can be performed, and an output unit 22 for outputting the print data to the printer 4 in accordance with a determination result obtained by the determination unit 21, as described in FIG. 6.

The determination unit 21 sends, in response to a URL and print data supplied from the ASP server 1, a test signal to the printer 4 specified by the supplied URL. Then, the determination unit 21 determines whether or not printing can be performed by the specified printer 4, by checking whether or not it receives a reply to the sent test signal, for example.

In the case where it determines that printing cannot be performed, the determination unit 21 outputs an impossibility signal representing that printing cannot be performed, to the output unit 22.

In response to the impossibility signal from the determination unit 21, the output unit 22 sends a change request for requesting change of printers 4 for outputting the print data, to the client terminal 3 via the ASP server 1.

On the contrary, in the case where the determination unit 21 determines that printing can be performed, it outputs a possibility signal representing that printing can be performed to the output unit 22.

In response to the possibility signal from the determination unit 21, the output unit 22 sends the print data supplied from the ASP server 1 to the printer 4.

If the print data server 2 comprises the above described functions, it can take an appropriate action in a case where a firewall is set between the print data server 2 and the printer 4, or in a case where the power of the printer 4 is turned off.

Figure 7:
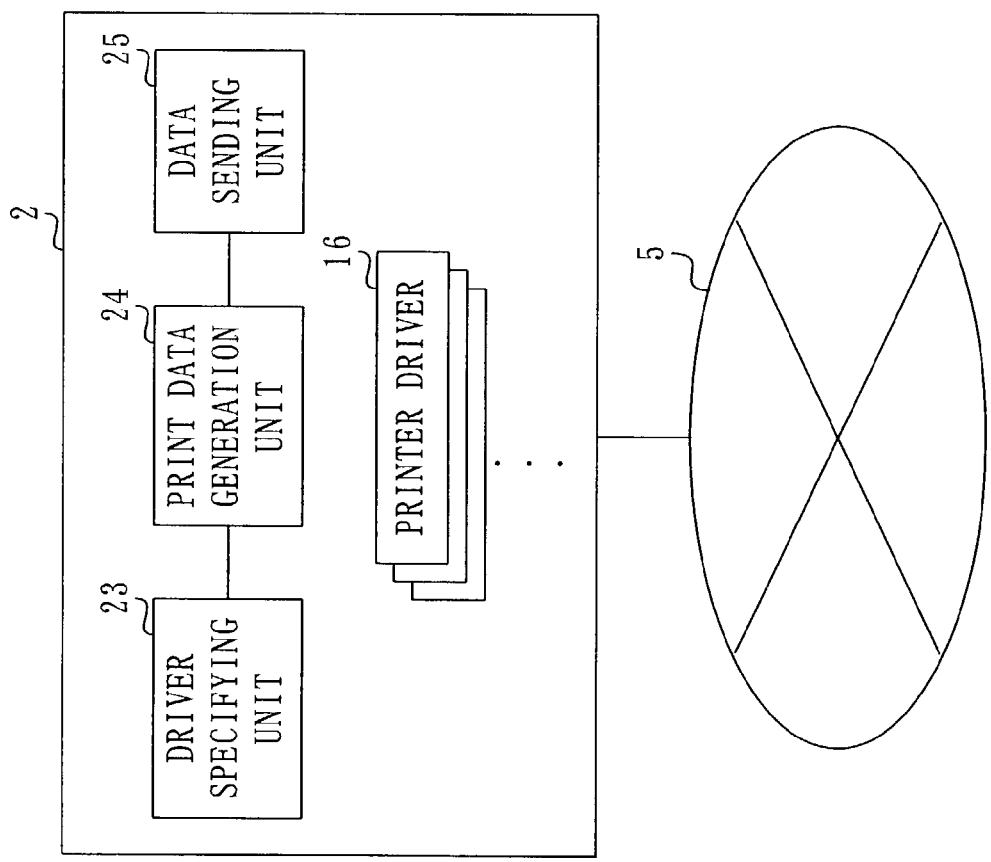
FIG. 7 is a diagram showing another structure of the print data server according to the first embodiment.

The plurality of printers 4 shown in the first embodiment may be of different types. In this case, as shown in FIG. 7, the print data server 2 may comprise a plurality of printer drivers 16. Each printer driver 16 corresponds to one of the plurality of printers 4, and generates print data for the printer 4 to which it corresponds. Further, the print data server 2 may comprise a driver specifying unit 23, a print data generation unit 24 and a data sending unit 25.

In this case, the print data output unit 12 of the ASP server 1 outputs a URL of a printer 4 and an interim result or final result of processing performed by the application software 13 to the print data server 2 in response to a print request signal from the client terminal 3.

In response to the URL supplied from the ASP server 1, the driver specifying unit 23 of the print data server 2 accesses a printer 4 specified by the supplied URL.

Then, the driver specifying unit 23 obtains information regarding the accessed printer 4 (type, etc.) from this printer 4.

The driver specifying unit 23 specifies a printer driver 16 which corresponds to the specified printer 4, by using the obtained information.

The print data generation unit 24 generates print data for printing the interim result or final result supplied from the ASP server 1, by executing the printer driver 16 specified by the driver specifying unit 23 using the interim result or final result.

Then, the data sending unit 25 sends the print data generated by the print data generation unit 24 to the printer specified by the supplied URL, using a push technique, for example.

If the print data server 2 comprises the above described structure, there is no need of unifying the type of the printers 4.

The servers and terminals of the present invention can be realized by a general computer, without the need for a dedicated apparatus. A program and data for controlling a computer to execute the above-described processes may be recorded on a medium (a flexible disk, CD-ROM, DVD or the like) and distributed, and the program may be installed into the computer and run on an OS (Operating System) to execute the above-described processes, thereby achieving the servers and terminals of the present invention. The above program and data may be stored in a disk device or the like included in a server device on the Internet, and embedded in a carrier wave. The program and data embedded in the carrier wave may be downloaded into the computer so as to realize the servers and terminals of the present invention.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2001-207803 filed on Jul. 9, 2001 and including specification, claims, drawings and summary. The disclosure of the above Japanese Patent Application is incorporated herein by reference in its entirety.

What is claimed is:

1. A printing system comprising:
a user terminal;
an application server which executes application software;
a data server which provides print data for printing an interim result or final result of processing performed by the application software; and
a printer which performs printing in accordance with the print data provided by said data server,
wherein:
said user terminal, said application server, said data server, and said printer are connected to one another via a communication network;
said application server includes a data generator which generates print data corresponding to content created from an interim result or final result of an application process preformed by the application server and initiated by a user input via the user terminal, and a first data sender which sends the generated print data to said data server; and
said data server provides the print data supplied from said first data sender to said printer.

2. The printing system according to claim 1, further comprising a user terminal which supplies a IJRL (Uniform Resource Locator) for specifying said printer to which the print data is to be provided, to said data server in accordance with an operation of a user,
wherein said data server sends the print data to said printer which is specified by the URL.

3. The printing system according to claim 2, wherein said data server includes:
a determiner which determines whether or not printing can be performed by said printer; and
a second data sender which sends the print data to said printer, in a case where said determiner determines that printing can be performed by said printer.

4. The printing system according to claim 1, wherein:
said data server provides the print data supplied from said first data sender to said printer by storing the print data supplied from said application server and supplying a URL (Uniform Resource Locator) that specifies a location of the data server to said printer; and
said printer includes a downloader which downloads the print data from the location of the data server specified by the URL.

5. The printing system according to claim 4, wherein:
said printer notifies said data server of completion of printing; and
said data server erases the stored print data in response to a notification from said printer.

6. A printing method comprising:
an executing step of executing application software in an application server;
a first data sending step of sending data from a user terminal to the application server;
a data generating step of generating in said application server print data corresponding to content created from an interim result or final result of an application process preformed by the application server and initiated by a user terminal;
a second data sending step of sending the print data from said application server to a data server connected thereto via a communication network;
a data providing step of providing from said data server, the print data supplied from said application server, to a printer connected to said data server via said communication network; and
a printing step of performing printing in said printer in accordance with the print data provided from said data server.

7. The printing method according to claim 6, wherein the data providing step further includes:
a first URL supplying step of supplying from a user terminal connected to said communication network, a URL (Uniform Resource Locator) for specifying said printer to which the print data is to be provided, to said data server in accordance with an operation of a user; and
a second data sending step of sending the print data from said data server to said printer which is specified by the URL.

8. The printing method according to claim 7, wherein the data providing step further includes:
a determining step of determining in said data server whether or not printing can be performed by said printer,
wherein said second data sending step includes a step of sending the print data from said data server in a case where it is determined in said determining step that printing can be performed.

9. The printing method according to claim 6, wherein the data providing step further includes:
a storing step of storing the print data supplied from said application server in said data server;
a second URL supplying step of supplying from said data server, a URL (Uniform Resource Locator) for specifying a location of the data server to said printer; and
a downloading step of downloading the print data to said printer from the location of the data server specified by the URL,
wherein said printing step includes a step of performing printing in accordance with the print data downloaded to said printer.

10. The printing method according to claim 9, further comprising:
a notifying step of notifying from said printer that printing is completed, to said data server; and
an erasing step of erasing the print data stored in said data server, in response to a notification from said printer.

* * * * *